United States Patent [19]

Moretti et al.

[11] Patent Number: 5,723,977
[45] Date of Patent: Mar. 3, 1998

[54] COMPOSITE ANNULAR ELEMENT, USABLE AS A PULSE WHEEL AND MADE OF A METAL INNER ANNULAR RING AND AN OUTER RING FORMED OF FRAGILE MATERIAL

[75] Inventors: Roberto Moretti, Cambiano; Matteo Genero, Santena; Rolando Cacciatore, Nichelino, all of Italy

[73] Assignee: SKF Industrie S.p.A., Torin, Italy

[21] Appl. No.: 655,731

[22] Filed: May 30, 1996

[30] Foreign Application Priority Data

May 30, 1995 [IT] Italy .................. TO95A0231

[51] Int. Cl.$^6$ .................. G01P 3/44; G01P 3/487; G01P 3/48
[52] U.S. Cl. .................. 324/207.22; 324/207.25
[58] Field of Search .................. 324/207.22, 207.25, 324/173, 174, 166; 384/448; 310/168

[56] References Cited

U.S. PATENT DOCUMENTS 5,166,611 11/1992 Kujawa, Jr. et al. .............. 324/207.22

FOREIGN PATENT DOCUMENTS 0 511 106 10/1992 European Pat. Off. .
0 640 838 3/1995 European Pat. Off. .
93 07 156 9/1993 Germany .

Primary Examiner—Walter E. Snow
Attorney, Agent, or Firm—Burns, Doane, Swecker & Mathis, L.L.P.

[57] ABSTRACT

A composite annular element, in particular a magnetic ring usable as a pulse wheel in a rolling bearing of a vehicle wheel hub; the element includes an appropriately polarized plastoferrite ring co-molded onto a metal annular ring for fitment to a rotary member; the metal annular ring is formed in one piece by pressing and bending sheet metal, and presents a sleeve portion for fitment to the rotary member, and a flange portion defining a shoulder for withstanding the axial thrust exerted by an assembly fixture, and connected continuously to the sleeve portion by a rib projecting radially outwards of the sleeve portion; the rib being defined by a 180° bend partially embedded inside the plastoferrite ring so as to leave a continuous annular radial clearance between the plastoferrite ring and the sleeve portion of the metal annular ring; and the rib preferably presenting locking means, which are embedded in the plastoferrite to prevent the metal annular ring and the plastoferrite ring from rotating in relation to each other.

11 Claims, 1 Drawing Sheet

COMPOSITE ANNULAR ELEMENT, USABLE AS A PULSE WHEEL AND MADE OF A METAL INNER ANNULAR RING AND AN OUTER RING FORMED OF FRAGILE MATERIAL

BACKGROUND OF THE INVENTION

The present invention relates to a composite annular element comprising a supporting assembly ring and a ring made of fragile material. Preferably, the material is appropriately magnetized plastoferrite, and the annular element according to the invention defines a magnetic detecting element fittable to the rotary element of a vehicle wheel hub rolling bearing or directly to the vehicle wheel hub to form a pulse wheel.

A major drawback of magnetic rings of the type described is the possibility of in-service damage—even serious damage, and particularly during assembly—to the plastoferrite portion, which is a fragile material of substantially the same characteristics as ceramic. The reason for this lies in excessive stress being transmitted by the supporting ring to the plastoferrite ring, which, even after assembly, is subjected to yet further stress caused by the different thermal expansions of the plastoferrite and metal supporting rings.

To overcome the above drawbacks, a magnetic ring has been proposed wherein a ring of partially flexible synthetic plastic material is co-molded between the plastoferrite and metal rings. This solution, however, has proved both expensive and ineffective.

SUMMARY OF THE INVENTION

It is therefore an object of the present invention to overcome the aforementioned drawbacks. More specifically, a first object of the present invention is to provide a composite element—in particular, a magnetic ring for detecting the angular position and/or speed of a rotary member—comprising a magnetized ring made of fragile material, such as plastoferrite, but which is safeguarded against breakage both during assembly and in use, even in applications involving widely differing temperatures. A further object of the present invention is to ensure that, even in the event of cracking or other, manufacturing or accidental, defects of the ring of fragile material, no fragments will be detached of such a size as to jeopardize adjacent mechanical members.

According to the present invention, there is provided a composite annular element, particularly a magnetic ring usable as a pulse wheel, comprising an annular assembly element for fitment to a rotary member; and a ring made of fragile material, and fitted radially outwards to and axially and angularly integral with the assembly element; characterized in that the annular assembly element comprises a metal annular ring formed in one piece by pressing and bending sheet metal, and in turn comprising a sleeve portion extending axially and which is fitted to the rotary member, a flange portion connected continuously to the sleeve portion on which it defines an axial shoulder for withstanding the thrust exerted by an assembly fixture, and an intermediate rib projecting radially on the outside of the sleeve portion and partly embedded inside said ring of fragile material, which is co-molded onto said rib so as to leave a predetermined continuous annular radial clearance between said sleeve portion of the metal annular ring and said ring of fragile material.

In particular, said rib is defined by a 180° bend in the sheet metal constituting the sleeve portion, which bend connects one end of the sleeve portion to the flange portion.

Moreover, said flange portion defining said axial shoulder projects radially on the inside of the sleeve portion and beyond the inside diameter of the ring of fragile material, so as to yield elastically under the axial stress applied by an assembly fixture, but without deforming said rib and the ring of fragile material co-molded onto the rib.

According to a preferred embodiment of the invention, said ring of fragile material is an appropriately magnetized plastoferrite ring.

The metal supporting ring is therefore so formed as to elastically absorb both radial stress during assembly, and any stress generated by the axial thrust to which the composite element is subjected during fitment to the rotary member, so that any deformation does not affect the ring of fragile material. Moreover, separating the plastoferrite ring from the portion of the metal supporting ring subjected to most stress, firstly during assembly and then in use, provides for rendering the plastoferrite ring fully independent of any deformation of the metal supporting ring.

According to a further aspect of the present invention, the rib onto which the plastoferrite ring is co-molded is deformed locally and peripherally to present a number of impressions or dents defining connecting projections, which, embedded inside the material of the plastoferrite ring, prevent even the slightest angular movement of the plastoferrite ring in relation to the metal supporting ring—which angular movement would make the plastoferrite ring unusable as a pulse wheel—and also prevent large slivers from breaking off the plastoferrite ring in the event of accidental cracking.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
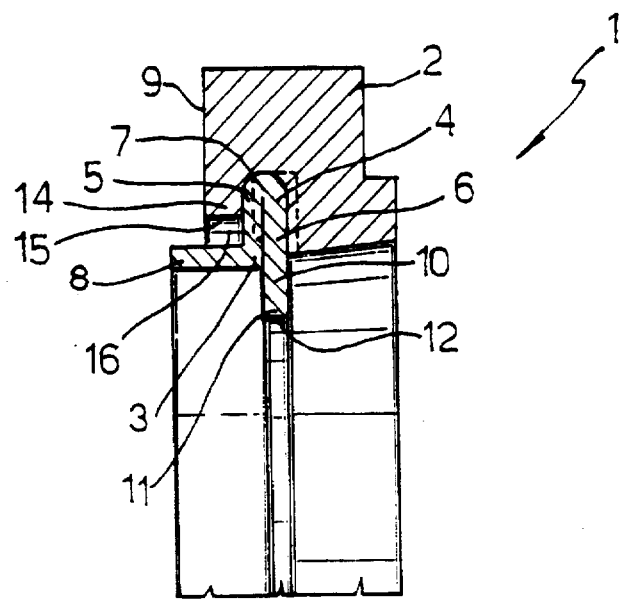
FIG. 1 shows a partial section of the magnetic ring according to the present invention.
Figure 2:
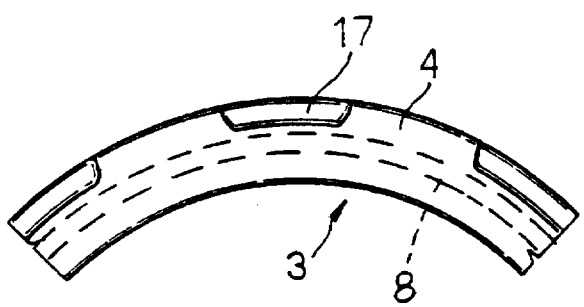
FIG. 2 shows a partial external side view of the supporting element of the FIG. 1 ring.

Number 1 in FIG. 1 indicates a composite annular element defined, in the non-limiting example described, by a magnetic ring for use as a pulse wheel in a rolling bearing or on a vehicle wheel hub (both known and therefore not shown), and connected to an appropriate fixed sensor to detect the angular position and/or rotation speed of a rotary member of the bearing or hub. According to the invention, ring 1 comprises a radially outer ring 2 made of fragile, magnetizable material—in the example shown, plastoferrite—and which is co-molded onto a coaxial but radially inner metal annular ring 3 forming the supporting and assembly element for fitment of ring 1 to said rotary member (not shown).

Ring 2 is toroidal in shape with a substantially L-shaped radial section, and is injection molded directly onto ring 3 placed inside the mold and which is thus partly embedded inside ring 2. The above known method therefore provides for forming a single body wherein ring 2, when set, is firmly connected to supporting ring 3 with no possibility of axial withdrawal. Once molded, ring 2 is polarized magnetically in known manner to form, on its periphery, a succession of appropriately alternating and/or spaced north and south poles, which, on moving past a magnetoelectric transducer when ring 1 is fitted to a rotary member, induce electric pulses indicating the rotational movement of the member to which ring 1 is fitted.

Supporting and assembly ring 3 is formed in one piece by blanking and bending appropriate sheet metal, e.g. zinc-plated steel, and comprises a cylindrical sleeve portion 8 coaxial with ring 2 and constituting, in use, an assembly element by which to fit ring 1 to said rotary member, normally by driving it inside a seat on the rotary member. Sleeve portion 8 therefore presents an axial length sufficient to ensure stable assembly in any application. Ring 3 also comprises a flange portion 10 projecting radially inwards of sleeve portion 8; and a circular rib 4, which is defined by a 180° bend 7 comprising two joined portions 5 and 6, is defined externally by a circular edge, and projects radially outwards of sleeve portion 8.

More specifically, portions 5 and 6 define an axial end of sleeve portion 8, lie in a radial plane comprising said circular edge, and extend radially inwards of the circular edge. A first portion, e.g. portion 5, is bent 90° on the opposite side to second portion 6, so as to form a cylindrical element defining sleeve portion 8, which projects axially from rib 4—more specifically, beyond a lateral surface 9 of ring 2—and is smaller in diameter than said circular edge of bend 7. Second portion 6, on the other hand, projects radially towards the axis of symmetry to form flat flange portion 10, which presents a free inner end 11 defined by a circle 12 smaller in diameter than sleeve portion 8, and an outer end coincident with the outer periphery of bend 7, so that rib 4 also acts as a continuous connecting element between sleeve portion 8 and flange portion 10.

Flange portion 10 forms an axial shoulder for receiving the axial thrust exerted by a known assembly fixture (not shown) when ring 1 is fitted to said rotary member, and may also form, on the opposite side, an axial stop shoulder for arresting the whole of ring 1 against a corresponding shoulder on the rotary member, e.g. for axially positioning ring 2 accurately in relation to the sensor.

According to the present invention, ring 2 is so formed as to be connected to ring 3 solely by rib 4, for which purpose, bend 7 comprising portions 5, 6 and defining rib 4 is partially embedded radially inside ring 2. For example, a lateral portion 14, adjacent to rib 4, of ring 2 is truncated radially, and presents an inner edge 15 separated from sleeve portion 8 of ring 3 by a continuous annular radial clearance 16, so that, from the outer end of sleeve portion 8 to the 90° bend in one of the portions of rib 4, any radial deformation of sleeve portion 8 is gradually eliminated and so prevented from being transmitted to ring 2.

Moreover, by virtue of the free inner end 11 of flange portion 10 projecting radially inwards, any deformation of end 11 caused by the assembly operation or by a gripping element (not shown) is absorbed elastically by projecting end 11 and prevented from being transmitted to rib 4, thus safeguarding ring 2 from possible breakage during assembly or as a result of irregular grippage. Similarly, being connected in projecting manner to rib 4, sleeve portion 8 yields elastically to any radial stress induced, for example, by incorrect assembly, and prevents it from being transmitted to rib 4, thus ensuring a high degree of safety of ring 2.

Ring 2 is preferably so formed that, on the portion 6 side, it extends radially towards the axis of element 1, beyond the diameter defined by edge 15, but terminates well short of end 11 of flange portion 10, which thus remains exposed.

Figure 3:
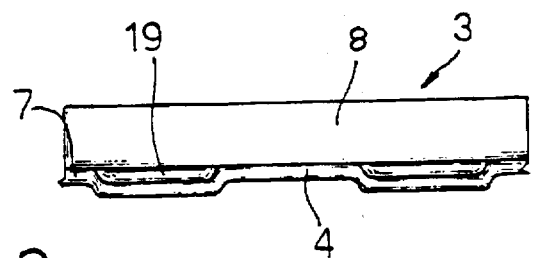
FIG. 3 shows a partial plan view of the FIG. 2 supporting element.

To prevent any possibility of rings 2 and 3 rotating in relation to each other, due to poor grippage at the co-molding stage, this is preceded by forming, on the opposite lateral faces of bend 7 and by permanent deformation, e.g. denting, a number of impressions 17 equally spaced about a circumference close to the outer edge of rib 4. On a first side of rib 4 (FIG. 3), impressions 17 define a number of cavities 19, which are filled with plastoferrite during the co-molding operation; and, on the opposite side, impressions 17 define a number of corresponding projections, which are embedded inside ring 2 together with the corresponding portion of bend 7. At any rate, impressions 17 form angular locking recesses embedded inside the material of ring 2, which is thus prevented from rotating in relation to ring 3.

According to a variation, not shown for the sake of simplicity, impressions 17 may be replaced by a number of holes formed through rib 4 close to its outer edge, or by teeth formed on the outer edge of rib 4.

Clearly, changes may be made to the element as described and illustrated herein without, however, departing from the scope of the present invention.

We claim:

1. A composite annular element usable as a pulse wheel, comprising an annular assembly element for fitment to a rotary member, and a ring made of fragile material, said ring being fitted radially outwards of and axially and angularly integral with said annular assembly element, the annular assembly element comprising a metal annular ring formed in one piece, the metal annular ring including an axially extending sleeve portion for being fitted to the rotary member, a flange portion connected continuously to the sleeve portion to define an axial shoulder for withstanding thrust exerted by an assembly fixture, and an intermediate rib projecting radially outwards of the sleeve portion, the intermediate rib being partly embedded inside said ring of fragile material and being co-molded onto said rib with a predetermined continuous annular radial clearance being provided between said sleeve portion of the metal annular ring and said ring of fragile material.

2. An annular element as claimed in claim 1, wherein said intermediate rib is defined by a 180° bend in the metal constituting the annular ring, the bend connecting one end of the sleeve portion to the flange portion.

3. An annular element as claimed in claim 1, wherein said flange portion defining said axial shoulder projects radially inwards of the sleeve portion and beyond an inside diameter of the ring of fragile material, the flange portion yielding elastically under axial stress applied by an assembly fixture without deforming the rib and the ring of fragile material co-molded onto the rib.

4. An annular element as claimed in claim 2, wherein said rib includes a first and a second portion joined to each other to form a circular rib defining said bend, said first and second portions being bent 180° onto each other in a radial plane and towards a rotation axis of said ring of fragile material.

5. An annular element as claimed in claim 4, wherein said first portion is bent 90° on an opposite side in relation to said second portion and merges into the axially extending sleeve portion which forms a cylindrical portion.

6. An annular element as claimed in claim 5, wherein said cylindrical portion is smaller in diameter than said circular rib.

7. An annular element as claimed in claim 4, wherein said second portion merges into said flange portion which is defined internally by a circular edge that is smaller in diameter than said sleeve portion.

8. An annular element as claimed in claim 1, wherein said radial clearance is interposed between said sleeve portion and a lateral portion, adjacent to said rib, of said ring of fragile material.

9. An annular element as claimed in claim 1, wherein said ring of fragile material is a magnetized plastoferrite ring.

10. An annular element as claimed in claim 1, including locking means formed on said rib for locking said ring of fragile material onto said metal annular ring.

11. An annular element as claimed in claim 10, wherein said locking means includes impressions defining a plurality of cavities, said impressions being circumferentially disposed and close to an outer edge of said rib, said cavities being filled with material forming said ring of fragile material.

* * * * *

UNITED STATES PATENT AND TRADEMARK OFFICE
CERTIFICATE OF CORRECTION

PATENT NO. : 5,723,977
DATED : March 3, 1998
INVENTOR(S) : Roberto MORETTI, Matteo GENERO and Rolando CACCIATORE It is certified that error appears in the above-indentified patent and that said Letters Patent is hereby corrected as shown below:

On title page, item [73]
Under Assignee: delete "Torin" and insert therefor -- Torino --.

Item [30]
Under Foreign Application Priority Data: delete "TO95A0231" and insert therefor --TO95A0443--

Signed and Sealed this

Sixth Day of October, 1998

Attest:

BRUCE LEHMAN

Attesting Officer

Commissioner of Patents and Trademarks